Patented May 6, 1941

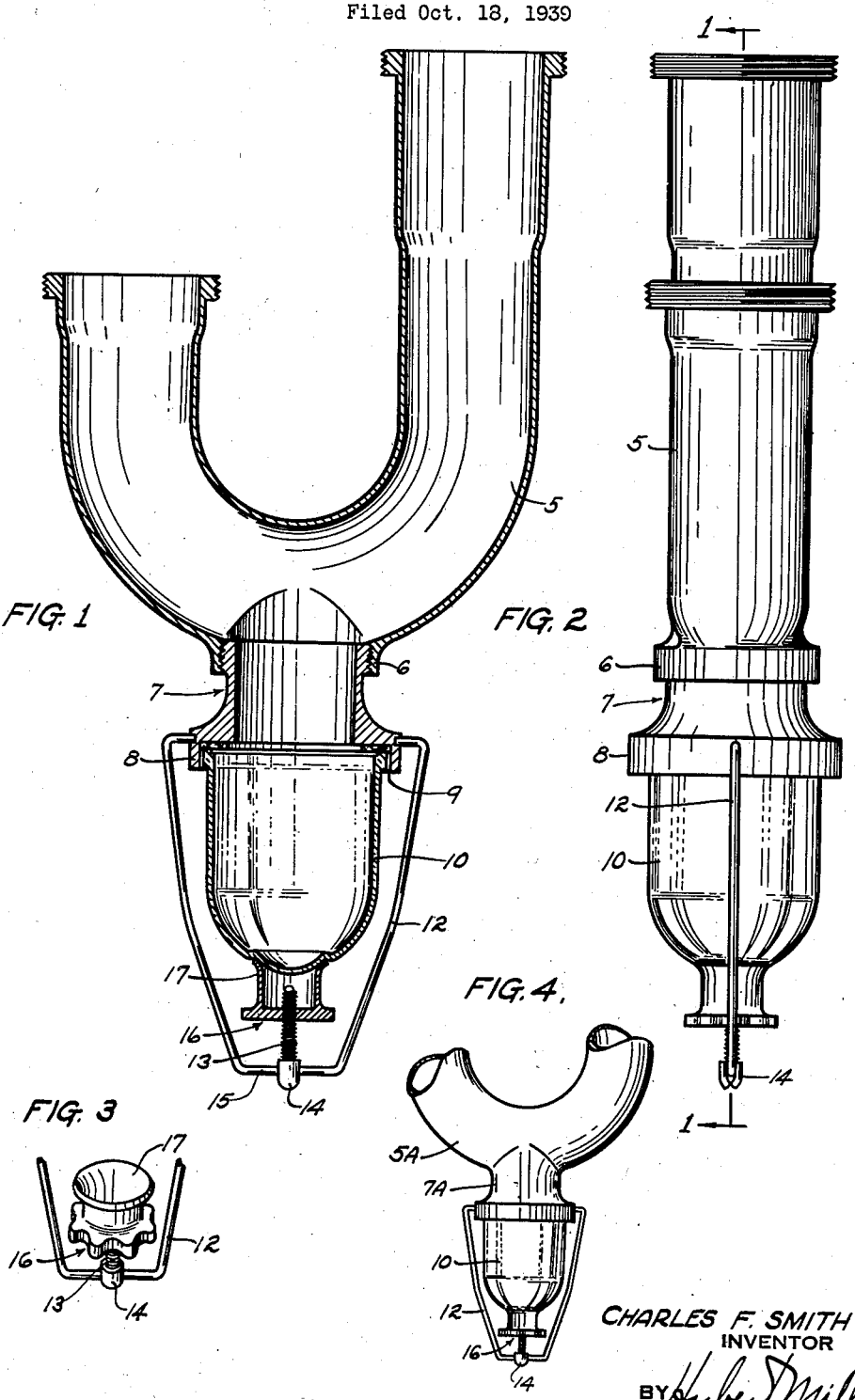

2,241,005

UNITED STATES PATENT OFFICE 2,241,005

DRAIN TRAP

Charles F. Smith, Dallas, Tex., assignor to Leo J. Williams, Oklahoma City, Okla.

Application October 18, 1939, Serial No. 300,009

3 Claims. (Cl. 182—24)

This invention relates to traps and more particularly to the type of trap generally used in connection with sinks and lavatory drains. As is well known by those familiar with this art, such traps serve a double purpose, i. e. they maintain a liquid seal between the lavatory outlet and the sewer to prevent sewer odors and gases from escaping into the house or building, and they serve to catch and hold refuse, foreign matter, jewels, pins, etc., which may accidentally pass through the lavatory outlet.

The chief objects of this invention are to provide a trap which may be more easily cleaned than traps presently in use, which is much more efficient in trapping foreign matter which accidentally finds its way into the trap, and which may easily and quickly be substituted for most traps now in general use.

The details in the construction of the two preferred forms of my invention, together with other objects attending its production, will be better understood from the following description when read in connection with the accompanying drawing, which is chosen for illustrative purposes only, and in which:

Figure 1 is a vertical sectional view of a trap embodying one preferred form of the invention, the view being taken along the line I—I of Fig. 2;

Fig. 2 is a side elevational view of the same trap;

Fig. 3 is a fragmentary perspective view of the lower portion of the traps illustrated in Figs. 1, 2, and 4;

Fig. 4 is a front elevation of a trap embodying a slightly different form of the invention.

Like characters of reference designate like parts in all figures.

The invention includes a substantially U-shaped pipe member 5, the ends of which are preferably threaded to facilitate connection of the device into a drain pipe. In the Fig. 1 embodiment, the member 5 is provided at its lowermost point with a short downwardly extending internally threaded neck 6 which is adapted to receive the similarly threaded upper end of a short connector 7. From Figs. 1 and 2 it will be noted that the bore of this connector is preferably as large in diameter as the bore of the member 5, so that any object which passes through the member 5 could also pass downward through this connector.

The connector 7 is enlarged at its lower end as indicated by the number 8, and within this enlarged portion is formed a co-axial seat 9 of larger dimension than the bore of the connector 7. The seat 9 is adapted to receive the open end of a preferably transparent bowl 10, a suitable gasket 11 being inserted between the base of the seat 9 and the end of the bowl 10, to prevent leakage of liquid between the two.

As a means of removably securing the bowl 10 firmly on its seat, I provide a substantially U-shaped wire cage 12, the two ends of which are pivotally connected to the enlarged lower end 8 of the connector 7, preferably as illustrated, so that the lower end of the cage 12 may be swung to either side of the common longitudinal axis of the bowl 10, the seat 9, and the connector 7.

The lower end of the cage 12 is preferably provided with an inwardly projecting threaded stud 13, the head of which may be rigidly secured thereto in any suitable manner. As one means of rigidly mounting the stud 13, I have illustrated its head 14 as being bifurcated to receive the cross piece 15 which forms the bottom of the cage. After the stud is in position on this cross piece, the spaced ears of its head are simply pressed together, as clearly shown in Fig. 2. It will be understood of course that this stud should be centrally positioned on the cross piece 15 so that when the bottom of the cage is suspended below the bowl 10, the stud 13 is in substantial axial alignment with the bowl, as illustrated in Figs. 1, 2, and 4.

A serrated thumb nut, designated as a whole by the numeral 16, is provided for the threaded stud 13. This nut is preferably provided with an integral flared skirt 17 which serves to contact the bottom central portion of the bowl 10 as the nut is turned in the proper direction on the stud 13, thus pressing the rim of the bowl tightly against the gasket 11.

To remove the bowl 10 from its seat, it is only necessary to back the thumb nut 16 away from the bottom of the bowl and pivot the lower end of the cage 12 slightly.

The embodiment of the invention illustrated by Fig. 4 differs from the previously described embodiment in that the connector 7A is made integral with the U-shaped member 5A, instead of being threadedly connected to that member. The remaining parts of the two embodiments are identical.

In operation, in case a finger ring, coin, or other valuable object should be accidentally dropped into the lavatory or sink, it will be clearly seen that when the object reached the bottom of the U-shaped members of either embodiment, it would drop through the bore of the connector and into the bowl 10, from which it could easily be recovered by removing the bowl as previously described. I also wish to point out that this invention would be invaluable in hospitals, laboratories, and the like, where mercury, and other valuable liquids sometimes find their way into lavatory drains.

While I have described and illustrated only two specific embodiments of the invention I am aware that changes may be made in the details of construction without transcending the inventive principle, and I do not wish to be limited except by the prior art and by the scope of the appended claims.

I claim:

1. A trap comprising: a substantially U-shaped pipe member having its two ends formed to facilitate its connection into a drain pipe; a bored connector in direct communication with the interior of said U-shaped member at its lowest point, said connector having an annular seat formed within its lower end; a transparent bowl the annular rim of which is adapted to seat on said seat; a substantially U-shaped cage having its two ends pivotally connected to said connector at opposite sides thereof; a threaded inwardly projecting stud made integral with the swinging end of said cage; and a thumb nut for said stud adapted to reciprocate thereon as it is tuned in opposite directions and to adjustably contact the bottom of said bowl and to thus force the bowl against its seat.

2. A trap comprising: a substantially U-shaped member; a bored connector one end of which is connected to said U-shaped pipe member at the bottom of the U; a seat for a bowl rim formed within the opposite end of said connector; a transparent bowl, the rim of which is of a size and shape to seat on said seat; a substantially U-shaped cage the two ends of which are pivotally connected to said connector; a threaded inwardly projecting stud carried integrally by the free end of said cage; a thumb nut for said stud; and an integral skirt on the inner end of said nut for contacting the bottom of said bowl as the nut moves inwardly, thus removably holding said bowl in position on its seat.

3. The combination with a substantially U-shaped pipe member, of: a bored bowl-seating connector one end of which is in direct communication with the interior of said U-shaped pipe member at the bottom of the U; a transparent bowl, the rim of which is adapted to seat within the opposite end of said connector; a substantially U-shaped cage the two ends of which are pivotally connected to said connector; a threaded inwardly projecting integral stud carried by the free end of said cage; and a thumb nut for said stud adapted to adjustably contact the bottom of said bowl for removably holding the bowl in position on its seat.

CHARLES F. SMITH.